Jan. 26, 1954 L. C. GROVE ET AL 2,666,951
METHOD AND APPARATUS FOR DRAWING PLASTIC SHEETS
Filed Aug. 30, 1951 2 Sheets-Sheet 1
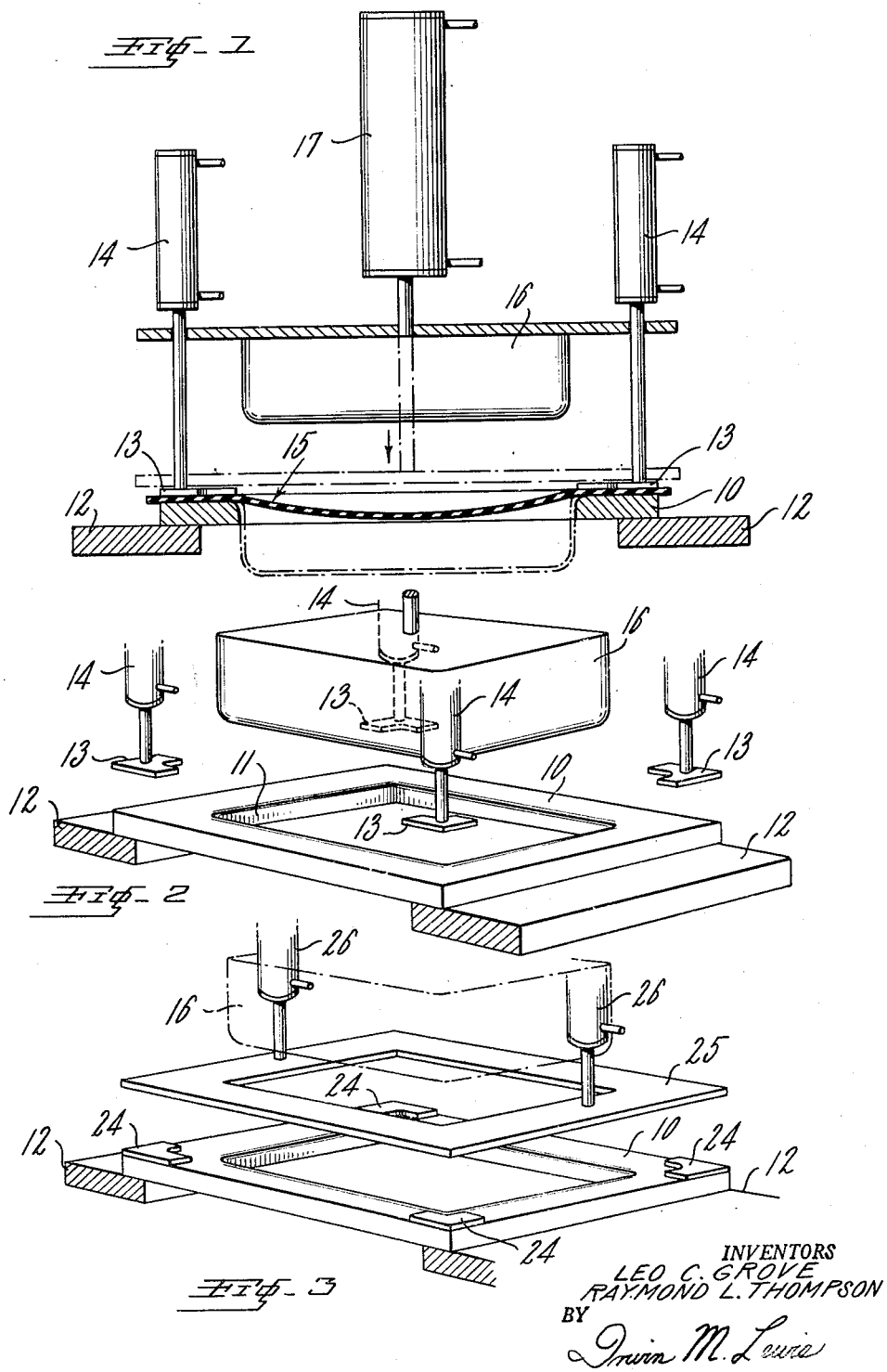
INVENTORS
LEO C. GROVE
RAYMOND L. THOMPSON
BY
Irwin M. Lewis
ATTORNEY

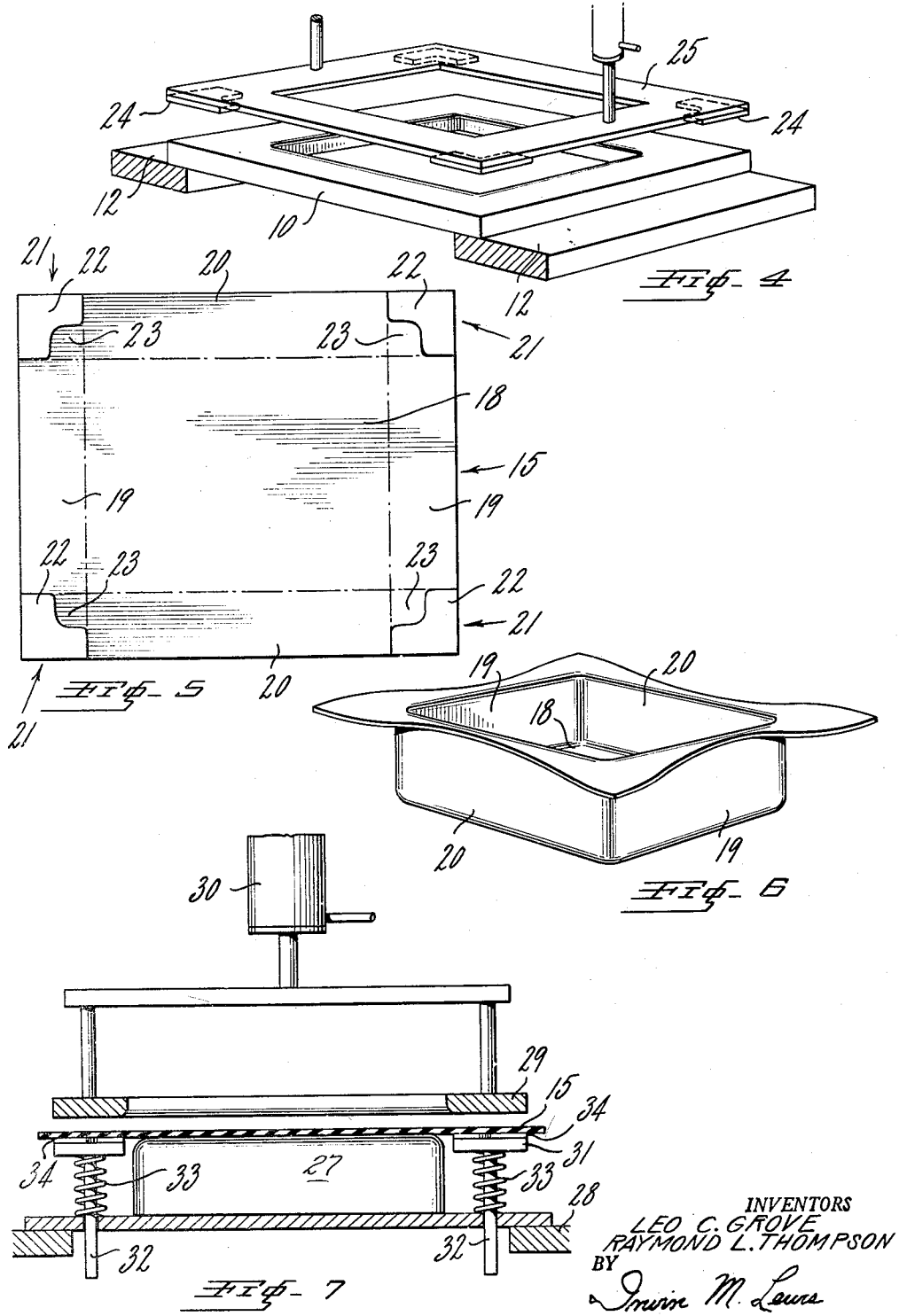

Patented Jan. 26, 1954

2,666,951

UNITED STATES PATENT OFFICE 2,666,951

METHOD AND APPARATUS FOR DRAWING PLASTIC SHEETS

Leo C. Grove, Elmhurst, and Raymond L. Thompson, Park Ridge, Ill., assignors to United States Rubber Company, New York, N. Y., a corporation of New Jersey Application August 30, 1951, Serial No. 244,394

12 Claims. (Cl. 18—19)

This invention relates to a method and apparatus for drawing a sheet of plastic material to form a hollow article having angular corners.

More particularly the invention relates to a method and apparatus for drawing plastic sheets to form hollow articles having angular corners of uniform wall thickness from top to bottom.

Heretofore it has been the practice of the drawing of plastic sheets to utilize either of two methods. According to the first method, a sheet of plastic was clamped in an open frame completely around its periphery and the plastic sheet heated to render it more ductile. The frame and plastic sheet were then placed on a draw ring and a male die or plug of a desired shape was pushed into the hot plastic sheet clamped in the frame. As the male plug was pushed into the plastic sheet, the sheet took the form of the plug. It can be seen that by that method the article was formed entirely by the stretching of the sheet, inasmuch as the sheet was anchored completely around its periphery in the frame. While such a method is quite satisfactory for shallow draws, it is not satisfactory for deep draws, as the stretching of the material as the plug is pushed into the sheet necessarily results in the article having a comparatively thick bottom portion and a progressively thinner wall portion.

According to the second method, the plastic was not clamped in a frame but was placed directly over the draw ring and a light clamping pressure used which would hold the plastic sheet in place but which would allow the plastic sheet to slip as the plug was pushed into the plastic sheet. By this method the plastic sheet was not stretched by the plug but was merely pulled through the draw ring by the plug and conformed to the shape of the plug thereby. Because the plastic sheet was not materially stretched, the bottom and the straight wall portions had a comparatively uniform wall thickness and therefore considerably deep draws could be made by using this method. However, difficulty was experienced in forming articles having angular corners by this method. In forming such articles by this method the corner portions were not uniform in wall thickness but rather were comparatively thin at the lower extent of the corners and much thicker at the upper extent of the corners. This was due to the fact that there was an excess of material in the sheet plastic blank at the points where the corners were to be formed. As the plug was pushed into the plastic sheet, this excess material quickly crowded in at the corners of the draw ring between the ring and the plug and rapidly built up in thickness preventing the material from being properly drawn through the ring at these points. The result was that the plastic material initially drawn through the ring was substantially stretched so that the wall thickness of the corners at the bottom was quite thin and the top portions were quite thick.

It is, therefore, among the objects of the present invention to provide a method and apparatus by which the plastic articles having angular corners may be formed so that the walls, bottom and corners are of substantially uniform thickness.

According to the present invention, the sheet of heated plastic is clamped only adjacent those points where corners are to be formed. The clamping at these points provides at least two important functions. The first, it blocks out a portion of the plastic sheet and thereby decreases the excess of material that is usually present at the corners. Second it decreases the rate of flow of the material at the corners so that the material may not build up in thickness, but will be fed uniformly as needed. The straight wall portions of the article, because the portions of the plastic blank from which they are formed are unrestrained, are quite uniform.

Other objects and advantages of the present invention will become apparent from the following description when read in conjunction with the accompaying drawings wherein:

Fig. 1 is a sectional view of one embodiment of the invention showing a sheet of heated plastic supported across the draw ring and clamped at its corners preparatory to moving the plug through the draw ring to form an article;

Fig. 2 is an isometric view of the embodiment of Fig. 1 showing the clamps in their non-clamping position and showing the position and shape of the clamps;

Fig. 3 is an isometric view of another embodiment of the invention in which raised bosses similar in shape to the clamps of Fig. 2 are provided on the draw ring adjacent the corners and a clamping frame is provided to clamp a sheet of plastic against the bosses;

Fig. 4 is an isometric view of still another embodiment of the invention in which raised bosses similar to those of Fig. 3 are provided on the clamping ring rather than on the draw ring;

Fig. 5 is a plan view of a sheet plastic blank utilized in the apparatus of the invention and showing those portions of the blank which are clamped in forming an article therefrom;

Fig. 6 is an isometric view of an article formed from the sheet of plastic of Fig. 5 by the apparatus of the invention; and Fig. 7 is a sectional view showing how the apparatus of the invention may be modified so that the plug may be stationarily mounted and the draw ring moved down over the stationary plug.

Referring to the drawings and in particular to Figs. 1 and 2 there is shown one embodiment of the present invention. This embodiment includes a draw ring 10 having an inner polygonal perimeter 11 which in the particular form shown is rectangular. The draw ring 10 is stationarily mounted on a support 12.

Four clamping feet 13 actuated by four air cylinders 14 are positioned adjacent but above the corners formed by the inner perimeter 11 of the draw ring 10 and serve to clamp marginal portions of a sheet of heated plastic 15 supported from its marginal edge across the opening in the draw ring. The plastic sheet is heated before placing it in the apparatus to render it more ductile and flexible.

A male forming die or plug 16 is mounted above the draw ring and is moved toward and through the opening of the draw ring by an air cylinder 17. The plug 16 is polygonal in cross section to correspond to the inner perimeter 11 of the draw ring 10, but is smaller in perimeter than the draw ring to provide a clearance between it and the draw ring to allow the plastic sheet to be drawn through the draw ring by the plug.

When the plug 16 is moved through the draw ring 10 it draws the sheet of plastic 15 through the draw ring to conform it to the shape of the plug as shown by the dotted lines of Fig. 1 to form a rectangular hollow plastic article as shown in Fig. 6.

In forming the article, that portion of the area of the plastic blank shown in Fig. 5 and identified as 18 forms the bottom. Marginal portions 19 and 20 form the four sides of the article. The remaining corner areas 21 are excess material. If the blank is not clamped, this excess material quickly crowds in at the corners of the draw ring between the ring and the plug and rapidly builds up in thickness thus preventing the material from being properly drawn through the ring. The result is that the plastic material initially pulled through the ring at the corners is considerably stretched so that the wall thickness of the lower extent of the corner of the article formed is quite thin while the upper extent of the corner is quite thick. The side and ends of the article are uniform in thickness because that portion of the blank which forms these sides and ends are of the proper area and are pulled through the draw ring without stretching.

If the plastic blank 15 is clamped completely around its periphery, the portions 19 and 20 of the blank 15 which form the side and ends of the article are considerably stretched so that the wall portions of the article are progressively thinner in wall thickness from bottom to top.

In the present invention, the clamping feet 13 immobilizes only those portions of the corner areas of the blank 15 identified as 22 in Fig. 5. This in effect blocks out a portion of the excess corner material leaving only those portions of the excess corner areas identified as 23 to be utilized in the forming operation. The rate at which these portions 23 are pulled in at the corners is reduced by reason of the proximity of the clamping feet 13. By properly proportioning the area of the clamping feet and by adjusting the distances between the clamping feet and the corners formed by the inner perimeter of the draw ring 10, the rate and therefore the amount of material which is pulled in at the corners can be accurately controlled so that there will not be a build up of the material at the corners but the material will be fed as needed to give a uniform wall thickness at the corners. Portions 19 and 20 of the sheet plastic blank 15 being unrestrained, are pulled quite readily through the draw ring 10 without material stretching so that the wall thickness of the sides and ends is essentially the same as the thickness of the original plastic blank. Any of the material of the portions 19 and 20 which may be restrained from being pulled through the draw ring by reasons of their proximity to the clamping feet 13, is compensated for in forming the article by the portions 23 of the sheet blank.

While the particular right angle shape of the clamping feet 13 shown in Figs. 1 and 2 is the preferred form, it is to be understood that other shapes could be used.

As can be seen by reference to Fig. 6 the article formed utilizes substantially all the material of the blank except for the excess corner portions. The article formed has substantially uniform wall thickness at all portions including the corners.

Referring to Fig. 3 there is shown another embodiment of the invention. In this embodiment raised corner pads or bosses 24 similar in shape to the clamping feet 13 in Fig. 2 are provided on the draw ring 10 adjacent the corners formed by the polygonal inner perimeter of the draw ring. The minimum height of these pads or bosses 24 is approximately equal to the thickness of the plastic blank.

The clamping frame or ring 25 similar in shape to the draw ring but having an inner circumference slightly larger than the draw ring to insure adequate clearance for the plug, is mounted above the draw ring and is moved toward the draw ring by air cylinders 26 to clamp the corner portions of the blank against the upper clamping surfaces of the pads or bosses 24. Portions of the excess corner areas 21 of the blank 15 are thereby immobilized in the same manner as previously described in conjunction with the clamping feet 13.

The portions 19 and 20 of the blank 15 are free to slip between the frame or clamping ring 25 and the draw ring 10 by reason of the space left therebetween when the frame 25 clamps the corners of the plastic blank against the raised pads or bosses 24. By making the pad 24 substantially equal to the thickness of the plastic blank, the portions 19 and 20 of the blank 15 are ironed and smoothed as they slip from between the clamping ring 25 and the draw ring, and wrinkling of the material as it is pulled through the ring is thereby prevented.

The raised pads or bosses also allow the heated plastic sheet to drape more deeply into the opening of the draw ring because the corners are clamped and supported on the raised upper surfaces of these pads. This is advantageous, as the more drape the material has, the less drawing is necessary to form the article.

The embodiment of Fig. 3 otherwise functions in the same manner as that of Figs. 1 and 2 previously described.

Referring to Fig. 4, there is shown a still further embodiment of the invention. This embodiment is similar to that of Fig. 3 except that the corner clamping pads or bosses 24 are secured to the clamping frame or ring 25 rather than to the draw ring 10. This embodiment functions in the same manner as that of Fig. 3.

Referring to Fig. 7 there is shown a modification of the invention in which a male forming plug or die 27 similar to that of Fig. 2, is stationarily mounted on a support 28. The draw ring 29 is mounted above the forming plug 27 and is moved down over the plug 27 by an air cylinder 30. A clamping frame or ring 31 similar to that of Fig. 4 is mounted on guide rods 32 and coil springs 33 surrounding the guide rods 32. Corner pads or bosses 34 identical to the pads 24 shown in Fig. 4 are secured to the clamping frame or ring 31 at the corners thereof.

In utilizing this modification to form a hollow article as shown in Fig. 6, a sheet of heated plastic 15 is placed over the plug 27 with the marginal portions thereof supported by the clamping frame 31. The draw ring 29 is moved down towards the clamping frame or ring by the air cylinder 30 and clamps the sheet of plastic material 15 at the corners thereof between the upper surfaces of the pads 34 and the draw ring 29. Portions 22 of the excess corner areas 21 of the blank 15 are thereby immobilized. Continued downward movement of the draw ring 29 forces the clamping frame 31 downward to compress coil springs 33. The clamped plastic sheet is thereby drawn through the draw ring and conformed to the shape of the male plug 27. The force of the compressed springs 33 maintains the clamping pressure between the pads 34 and draw ring 29 to immobilize portions 22 as previously described.

While in the modification of Fig. 7 the pads 34 are shown secured to the clamping frame 31, it is to be understood that these pads could be secured to the draw ring in the same manner as shown in Fig. 3, or the clamping ring 31 and the pads 34 could be eliminated and four clamping feet used in the manner shown in Fig. 2.

From the above description it can be readily seen that the present invention provides a method and apparatus by which a hollow polygonal article having uniform wall thickness may be formed from a sheet of plastic.

It is to be understood that the above description and the accompanying drawings are for the purpose of illustration only and not by way of limitation and that changes and modifications may be made therein without departing from the spirit and the scope of the invention.

Having thus described our invention, what we claim and desire to protect by Letters Patent is:

1. A method of forming a ductile sheet into an article having angular corners comprising, supporting the sheet on a draw ring having angular corners, effecting relative movement between the draw ring and a male forming plug having mating angular corners to pull the sheet through the draw ring and conform it to the shape of the plug, and immobilizing only portions of the sheet adjacent the angular corners during the effectuation of said relative movement to prevent an excess of the sheet from being drawn in at the angular corners.

2. In a method of forming a ductile sheet into a hollow article having angular corners with a draw ring and male forming plug, the steps of, immobilizing only marginal portions of the sheet adjacent the angular corners to prevent an excess of material from being pulled through the draw ring at the angular corners and effecting relative movement between the draw ring and the plug to form the article.

3. In forming a hollow article from a sheet of ductile material with a draw ring and plug having mating angular corners, the steps of, supporting the sheet along its marginal edge in alignment with the draw ring, effecting relative movement between the plug and ring to pull the sheet material through the ring to conform the sheet to the shape of the plug, and simultaneously restraining only marginal portions of the sheet adjacent the angular corners to prevent an excess of the sheet from being pulled through the ring at the angular corners.

4. In a method of forming a polygonal hollow receptacle with a polygonal shaped draw ring and forming plug from a sheet of ductile material, the steps of, supporting the sheet from its marginal edge across the draw ring, effecting relative movement between the ring and plug to pull the material through the ring and conform it to the shape of the plug and restraining only marginal portions of the sheet adjacent the corners of the polygonal ring simultaneously with the effectuation of said relative movement to prevent an excess of the sheet from being pulled between the corners of the ring and plug.

5. The method of forming a polygonal hollow receptacle with a polygonal shaped draw ring and forming plug from a sheet of ductile material, the steps of supporting the sheet from its marginal edge across the draw ring, effecting relative movement between the ring and plug to pull the material through the ring and conform it to the shape of the plug and immobilizing only marginal portions of the sheet adjacent the corners of the polygonal ring simultaneously with the effectuation of said relative movement to prevent an excess of the sheet from being pulled between the mating corners of the ring and plug, and allowing the other portions of the sheet to slip while simultaneously smoothing said other portions.

6. Apparatus for drawing a hollow polygonal article from a ductile sheet comprising, a draw ring having an inner polygonal perimeter, a mating polygonal male forming plug, clamps for clamping marginal portions of the ductile sheet only at points adjacent the corners of the polygonal draw ring to thereby immobilize portions of the ductile sheet adjacent said corners and means for effecting relative movement between said draw ring and said plug to form the polygonal article.

7. Apparatus for drawing a hollow polygonal article from a ductile sheet comprising, a draw ring having an inner polygonal perimeter, a mating polygonal male forming plug, a clamping ring, raised bosses on the clamping ring providing clamping surfaces for clamping the ductile sheet only at marginal portions adjacent the corners of the polygonal draw ring, means for effecting relative movement between the draw ring and the clamping ring to clamp the sheet between the said bosses and said draw ring and means for effecting relative movement between the draw ring and the male forming plug to form the polygonal article.

8. Apparatus for forming a polygonal article from a ductile sheet comprising, a draw ring having an inner polygonal perimeter, a mating polygonal male forming plug, raised bosses on the draw ring adjacent the corners formed by the polygonal inner perimeter, said bosses providing clamping surfaces, means for clamping the ductile sheet against said bosses, and means for effecting relative movement between the draw ring and the male forming plug to form the polygonal article.

9. Apparatus for drawing a hollow polygonal article from a ductile sheet comprising, a draw ring having an inner polygonal perimeter, a mating polygonal male forming plug, raised bosses on the draw ring adjacent the corners formed by the polygonal inner perimeter, said bosses providing clamping surfaces, a clamping ring, means for effecting relative movement between said clamping ring and said draw ring to clamp the ductile sheet between the clamping ring and bosses and means for effecting relative movement between the draw ring and the forming plug to form the polygonal article from the clamped sheet.

10. Apparatus for forming a hollow polygonal article from a ductile sheet comprising, a draw ring having a polygonal inner perimeter, a mating polygonal male forming plug, raised bosses on the draw ring adjacent the corners formed by the polygonal inner perimeter, the bosses having a thickness only slightly greater than the thickness of the ductile sheet, a clamping ring, means for effecting relative movement between the clamping ring and the draw ring to clamp the ductile sheet between the bosses and the clamping ring whereby marginal portions of the sheet adjacent said corners clamped between said bosses and said clamping ring are immobilized and the remainder of the sheet may slip between the clamping ring and the draw ring and be smoothed thereby, and means for effecting relative movement between said draw ring and said male forming plug to form the polygonal article.

11. Apparatus for forming hollow polygonal articles comprising, a draw ring having a polygonal inner perimeter, a mating polygonal male forming plug, a clamping ring, raised bosses on the clamping ring providing clamping surfaces, said bosses having a thickness somewhat greater than the thickness of said ductile sheet, means for effecting relative movement between said clamping ring and said draw ring to clamp the ductile sheet between the bosses and the draw ring, said bosses being positioned to clamp only portions of the ductile sheet adjacent the corners formed by the polygonal inner perimeter of the draw ring, whereby said portions will be immobilized but the remainder of the sheet may slip between the clamping ring and the draw ring and be smoothed thereby, and means for effecting relative movement between said draw ring and said male forming plug to form the polygonal article.

12. Apparatus for forming a hollow polygonal article from a ductile sheet comprising, a draw ring having a polygonal inner perimeter, a mating polygonal male forming plug, means for clamping the marginal portions of the ductile sheet only at points adjacent the corners formed by the polygonal inner perimeter to immobilize portions of the ductile sheet adjacent said corners, means for effecting relative movement between said drawring and said plug, and means for smoothing the unclamped marginal portions of the sheet prior to its being drawn through said ring.

LEO C. GROVE.
RAYMOND L. THOMPSON.

References Cited in the file of this patent
UNITED STATES PATENTS

| Number | Name | Date |
|---|---|---|
| 2,229,613 | Strauch | Jan. 21, 1941 |
| 2,285,903 | Clark | June 9, 1942 |
| 2,357,806 | Borkland | Sept. 12, 1944 |
| 2,444,420 | Borkland | July 6, 1948 |